United States Patent Office 2,714,550
Patented Aug. 2, 1955

2,714,550

NONELECTROLYTIC PRODUCTION OF CHLORINE

Ralph Miller, Pleasantville, N. Y., assignor to The Chemical Foundation, Incorporated, a New York membership corporation No Drawing. Application December 10, 1951,
Serial No. 260,939

10 Claims. (Cl. 23—219)

This invention is concerned with the production of chlorine and more particularly with the production of non-electrolytic chlorine by means of ammonium chloride.

The process basically involves the controlled oxidation of ammonium chloride to form ammonia, water and chlorine. Although the oxygen in the air is the fundamental oxidizing agent, the process is so conducted that the chlorine is formed in the absence of non-condensible gases using reagents employed in a cyclic fashion. While this process can employ ammonium chloride from any source, the process finds its widest applicability when employed in conjunction with a Solvay process ammonia soda plant. A large amount of the sodium carbonate made at Solvay process plants is used to make caustic soda in accordance with the well known reaction:

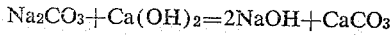

$$Na_2CO_3 + Ca(OH)_2 = 2NaOH + CaCO_3$$

Caustic soda is also made by the electrolysis of brine concomitantly with the production of chlorine. The production of chlorine has been increasing rapidly and along therewith has been an increase in the production of caustic soda. The amount of caustic made concomitantly with chlorine is now larger than the amount made from soda ash. As a result of this development the producers of soda ash have had to go into the production of electrolytic chlorine to retain their share of the caustic soda market. If the present trend of increasing need for chlorine continues without a simultaneous increase in the need for caustic soda, a time will come where there will not be a profitable market for the caustic soda produced with the chlorine. As a result of this condition there is need for an economic method for the making of chlorine without the simultaneous production of a material already in ample supply.

The desirability of a process which will produce chlorine non-electrolytically has been recognized for many years. During the last war there was an especial need for an alternate method of producing chlorine. As a result of this need intensive studies were made by industry and by government-appointed committees to uncover or devise an economical non-electrolytic chlorine process. The results of these efforts are summarized by H. F. Johnstone in "Chemical Engineering Progress" vol. 44, pages 657–668 (1948) in a paper entitled "Chlorine Production—Non Electrolytic Processes." Although this problem received the intensive study and experimental work described by Johnstone, no additional production of chlorine resulted. The reasons are set forth in Johnstone's paper. From the foregoing it can be gleaned that the process of this invention is an answer to this need.

It is an object of this invention to produce chlorine by chemical means as distinguished from electrolytic means.

A further object of this invention is the conversion to chlorine of the chloride portion of the sodium chloride used in the Solvay ammonia soda process.

Another object of this invention is the elimination of at least part of the lime consumed in the Solvay process along with the production of chlorine.

A primary object of this invention is the formation of chlorine in the presence of at most minor quantities of or substantial absence of non-condensible gases.

A fundamental object of this invention is an integrated process for the production of caustic soda and chlorine from sodium chloride by chemical means which is more economical than the electrolysis of sodium chloride.

The production of soda ash at an ammonia soda plant may be summarized by the reaction:

$$CaCO_3 + 2NaCl = CaCl_2 + Na_2CO_3$$

This overall reaction is the result of a whole series of reactions among which are:

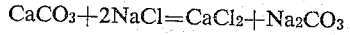
$$CaCO_3 = CaO + CO_2$$
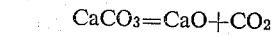
$$NH_3 + H_2O + CO_2 = NH_4HCO_3$$
$$NaCl + NH_4HCO_3 = NaHCO_3 + NH_4Cl$$
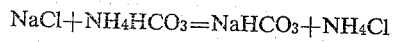
$$2NH_4Cl + CaO = CaCl_2 + 2NH_3 + H_2O$$
$$2NaHCO_3 = Na_2CO_3 + H_2O + CO_2$$

The foregoing well known reactions serve to illustrate the point that in the Solvay process the sodium portion of the sodium chloride is recovered as part of the final product, the chloride is normally wasted and 2 mols of $NH_4Cl$ are formed in solution and decomposed with lime for every mol of sodium carbonate produced.

In the process of this invention rather than decomposing the ammonium chloride with lime, the ammonium chloride is separated from the filtrate by any of the known evaporation and crystallization procedures. The recovery of the ammonium chloride does not constitute any portion of this invention since suitable procedures are readily available. The initial step of the process is the conversion of the ammonium chloride to manganous chloride. It is preferable, although not essential, that the ammonium chloride be converted to manganous chloride and ammonia and the ammonia be recycled to the Solvay plant.

One method which is especially useful is to thoroughly mix the separated ammonium chloride with manganous oxide. The mixed solids are heated in a muffle furnace. The temperature of the mixture is gradually raised preferably above 340° C. As the temperature rises, the reaction (1)  $2NH_4Cl + MnO = H_2O + 2NH_3 + MnCl_2$
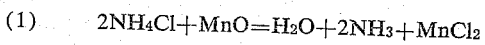

takes place. The ammonia and water vapor are driven off as gases and solid manganous chloride remains. By raising the temperature above 340° C. the manganous chloride will be substantially free from ammonium chloride. It is preferable to secure as the product of this step pure manganous chloride containing substantially no ammonium chloride. The manganous chloride may contain some unreacted manganous oxide. While this is not desirable since it increases certain fuel costs, as long as the content of manganous oxide is not excessive, the workability of the process is not affected.

Should conditions such as the use of inefficient equipment prevent the production of pure manganous chloride, the manganous chloride can be freed from excessive quantities of manganous oxide by dissolving the manganous chloride in as little water as possible and filtering the solution. The separated manganous oxide is returned to the ammonia liberation step. The resulting manganous chloride solution is preferably concentrated to dihydrated manganous chloride prior to its use in the next step.

A second method of forming manganous chloride from ammonium chloride consists of forming a concentrated ammonium chloride solution, adding solid manganous oxide in excess to the solution and boiling it to drive off ammonia. As the reaction proceeds additional solid ammonium chloride may be added to the solution providing solid manganous oxide is always present in excess. The solution is boiled and if necessary, evaporated, until a solution containing about 50% manganous chloride is formed. The solution is then filtered to remove the solids present. This operation is similar in many respects to the familiar ammonia recovery step of the classical Solvay process except that emphasis is placed on forming a solution as concentrated as possible. If a concentrated solution of manganous chloride is formed it may be used in the next step as such but it usually is preferable to evaporate it to form solid hydrated manganous chloride.

The ammonia replaced by the manganese is recycled to the Solvay ammonia soda plant. This operation supplants the liming and ammonia distillation step of the Solvay process. Hence, it avoids the necessity of consuming lime. This step and means described below may also permit the diminution of the amount of limestone that must be calcined.

The next step in the process is the formation of chlorine from the manganous chloride. Chlorine is formed by reacting manganous chloride with manganese dioxide and nitric acid. The principal reaction which takes place may be written:

(2) 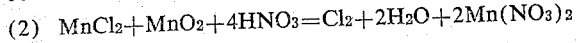
$MnCl_2 + MnO_2 + 4HNO_3 = Cl_2 + 2H_2O + 2Mn(NO_3)_2$

Since the reactants contain the constituents which make up aqua regia, nitrosyl chloride tends to form in accordance with the reaction:

(3) 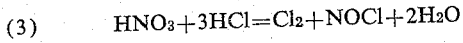
$HNO_3 + 3HCl = Cl_2 + NOCl + 2H_2O$ and provision must be made to recover any nitrosyl chloride that accompanies the chlorine. In addition there is the tendency for oxides of nitrogen to form and provision to prevent the loss of oxides of nitrogen must also be made.

In carrying out the chlorine formation reaction, it is preferred to employ a suitably lined reaction tower provided with suitable feed openings through which the manganous chloride, manganese dioxide and nitric acid may be fed. It is usually preferable to feed the $MnO_2$ close to the top of the tower. The manganous chloride may be fed along with the manganese dioxide or at a point somewhat below it. The nitric acid is added to the tower below the feed point of the other reactants. It is preferable to have an excess of nitric acid and manganese dioxide in the reaction zone. This can be accomplished without increasing the costs unduly. How this is accomplished is described below.

Manganous nitrate is the non-gaseous product of reaction 2. The manganous nitrate leaves the reaction zone in the form of a relatively concentrated solution. The following step in the process is the thermal decomposition of manganous nitrate to form manganese dioxide and nitric acid. By carrying out the thermal decomposition in the presence of air and under conditions whereby the nitric acid is not subjected to an elevated temperature for more than a brief period of time, the manganous nitrate is thermally decomposed in accordance with the reaction:

(4) 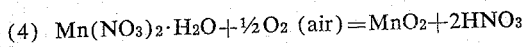
$Mn(NO_3)_2 \cdot H_2O + \frac{1}{2}O_2 \text{ (air)} = MnO_2 + 2HNO_3$ The nitric acid is recycled to the chlorine formation step of the process. The appropriate portion of the manganese dioxide is reduced to manganous oxide. The reduction of manganese dioxide is a relatively simple operation. All of the common reducing agents can be used although the preferred ones are oil and natural gas.

From the foregoing it can be seen that this novel chlorine production process is made up of the following steps:

1. The reaction of ammonium chloride and manganous oxide to form solid manganous chloride, water and ammonia.
2. The formation of chlorine by reacting together manganous chloride, manganese dioxide and nitric acid.
3. The thermal decomposition in the presence of air of manganous nitrate to form manganese dioxide and nitric acid.
4. The reduction of a portion of the manganese dioxide to form manganous oxide.

It was pointed out above that in the chlorine formation reaction there is the tendency for the formation of nitrosyl chloride and oxides of nitrogen. These substances may leave the reaction tower along with the chlorine. To prevent the contamination of the chlorine and the nitric acid loss represented by these substances, the gas leaving the reaction tower is scrubbed with a slurry of manganese dioxide. The slurry of manganese dioxide will react with any nitrosyl chloride or oxides of nitrogen in the gas but does not affect the chlorine in any way. There is the possibility that some oxides of nitrogen will be formed in the thermal decomposition of the manganous nitrate. To insure their recovery the gases leaving the thermal decomposition step after the nitric acid has been condensed are washed with a slurry of manganese dioxide. Washing of these gases in the described manner results in the formation of manganous nitrate and some manganous chloride. The resultant solutions may be evaporated and the concentrated solutions returned to the reaction zone in which the chlorine is formed. These operations are minor from a processing standpoint but they guard against reagent losses. By suitable equipment design the equivalent of these operations may be carried out in the chlorine formation reaction apparatus and the nitric acid condensers.

The entire process can be carried out continuously. Each step can be carried out in various ways. Local conditions and equipment developments dictate the preferred method in any particular instance.

One method of carrying out the reduction of the manganese dioxide consists of using a multiple hearth muffle furnace. The heating of the manganese dioxide is kept completely indirect. The manganese dioxide is heated to about 700–750° C. and then oil sprayed on to the hot oxide. The oil reacts with the manganese dioxide to form manganous oxide, carbon dioxide and water vapor. By keeping the gases undiluted with air a source of high strength carbon dioxide becomes available. This carbon dioxide can be used to advantage in the Solvay plant. Additional sources of carbon dioxide will be pointed out below. The manganese dioxide can be reduced to manganous oxide almost completely. The final product contains in excess of 98% MnO when the operation is properly conducted.

The second step in the process is also preferably carried out in a multiple hearth muffle furnace in which all of the hearths are as completely muffled as possible. This means all of the heating is indirect. The solid ammonium chloride is intimately mixed with the manganous oxide in a mixer designed to recover the ammonia which starts to vaporize almost immediately. The mixture is fed to the top-most hearth of the furnace. The mixture is moved slowly down the furnace by means of rabble arms. As the mixture moves down the furnace it is agitated by the rabble arms and its temperature is raised. The mixture is heated above 340° C. and preferably to about 400° C. Any unreacted ammonium chloride is vaporized at these temperatures so that the product of the reaction is substantially free from ammonium chloride. The ammonia leaves the furnace and is cooled to remove as much water vapor as possible. The cool ammonia is returned to the Solvay process plant.

The solid manganous chloride is conveyed to a reaction tower equipped with heating coils or the equivalent thereof. The tower is lined with acid proof brick to withstand the corrosive reactants. The manganous chloride is added to the tower along with at least an equivalent amount of finely divided manganese dioxide. For every mol of manganous chloride added to the tower 4 mols of nitric acid are added. A convenient concentration of nitric acid to add is 63% HNO3. The contents of the reaction tower are kept hot by means of the steam coils with which the reation tower is equipped. From the reaction $$MnO_2 + MnCl_2 + 4HNO_3 = 2Mn(NO_3)_2 + 2H_2O + Cl_2$$

it can be seen that about half a pound of water is formed for every pound of chlorine formed. To cause the reaction to go substantially to the completion it is advantageous to have an excess of $MnO_2$ and nitric acid present in the reaction zone and to have the temperature of the reactants reach a temperature of about 135° C. By adding $MnO_2$ in excess to the tower little or nothing is lost since the excess $MnO_2$ can go through the cycle as though it were inert. By maintaining the bottom of the reaction tower at about 135° C. the composition of the outgoing solution approximates $Mn(NO_3)_2 \cdot 5H_2O$. If a small quantity of excess nitric acid is added to the tower it will tend to concentrate at the location in the tower where the temperature is about 120° C. Being a liquid it will tend to flow down the tower. However, as it flows down the tower its temperature is increased and it vaporizes causing it to rise in the tower. As the hot nitric acid vapors flow up the tower it meets a relatively dilute nitrate solution. The relatively dilute nitrate solution is formed as a result of the water formed in the reaction. Heat is exchanged between the concentrated acid vapors and the relatively dilute nitrate solution causing the concentrated acid to condense and water to vaporize. The reaction tower preferably is equipped with a dephlegmator or partial condenser. The partial condenser maintains the temperature of the vapor leaving the top of the tower at about 100° C. Under these conditions, chlorine and water can leave the tower but little or no nitric acid will escape from the top outlet of the reaction tower. The temperature of the exit gases are so controlled that a small but continuous amount of condensate is formed. This condensate washes the up-coming vapor and wets the manganese dioxide and manganous chloride which preferably enter the reaction tower at locations above the inlet of the nitric acid. If this zone is sufficiently extended, the gases formed in the reaction will be contacted with a slurry of manganese dioxide and only water vapor and chlorine will leave the reaction tower in the gaseous phase.

Manganous nitrate is substantially completely decomposed at the relatively low temperature of 200° C. This fact has been known for many years. The simple thermal decomposition of manganous nitrate takes place in accordance with the reaction (5) $$Mn(NO_3)_2 = MnO_2 + 2NO_2$$

Prior processes for the production of chlorine which employed the thermal decomposition of manganous nitrate recovered the oxides of nitrogen formed in the thermal decomposition as nitric acid by absorbing the nitrogen oxides in water in the presence of air employing the procedures followed in the production of nitric acid from ammonia subsequent to the initial oxidation step. These procedures necessitate a costly plant. In fact, to diminish the cost this operation is frequently carried out at the elevated pressure of about 100 pounds per square inch. To further cut this cost, plants are being designed to use pure oxygen rather than air. Obviously if a simple nitric acid condenser can be substituted for the costly plant previously suggested then substantial economies will be made. To produce nitric acid rather than oxides of nitrogen the thermal decomposition must be carried out in the presence of an excess of air, at minimum temperatures and under circumstances that subject the nitric acid to elevated temperatures for as brief a period of time as possible. One method that has been suggested for carrying out the thermal decomposition so that nitric acid is formed is as follows:

An internally heated, acid resisting rotating drum is placed within a housing connected to a nitric acid recovery system. A concentrated solution of manganous nitrate is maintained at a level such that it covers the lower half of the drum. The drum is heated to a temperature in excess of 200° C. A small vacuum is maintained on the decomposition unit and the nitric acid recovery system so that all the leakage is inward and an excess of air is present in the space adjacent to the drum surface. The drum is slowly rotated. As the surface of the drum emerges from the solution a relatively thin film adheres to the drum surface. As the drum slowly travels around, the temperature of the film of liquid increases—initially evaporating water and then decomposing the manganous nitrate. The solid manganese dioxide formed on the drum tends to adhere to it. The rate of rotation of the drum is regulated so that substantially all of the manganous nitrate in the initial film of solution is decomposed just before the drum reenters the solution. A scraper blade is located a little above the surface of the solution to scrape the manganese dioxide off the drum before it reenters the solution.

Such a system works very well. The only disadvantage is that it necessitates expensive materials of construction and it is difficult to build individual units with a large capacity.

A method which overcomes the disadvantages of the drum decomposer utilizes an altogether different technique. This new way of carrying out the thermal decomposition of manganous nitrate in the presence of air employs hot, solid, finely divided particles of manganese dioxide in a dense phase fluidized bed. Into a hot, dense phase fluidized bed of manganese dioxide through which air is passed, a solution of manganous nitrate is sprayed. A fluidized bed possesses a multiplicity of advantages for carrying out this reaction. Even a very large fluidized bed can be maintained within a few degrees of a desired temperature. A fluidized bed affords a very extended heat transfer surface so that the decomposition can be carried out rapidly. There is a rapid flow of gases out of the bed which carries the gaseous decomposition products out of the reaction zone quickly. This decreases the formation of nitric oxides. The method by which the temperature of the solid particles constituting the fluid bed is increased is simple and efficient. A portion of the solid particles of the fluidized bed is withdrawn from the decomposition zone and conveyed by an air lift to a heating zone. Either oil or gas is burned with air in a fluidized bed of the withdrawn manganese dioxide. The heated manganese dioxide is then returned to the decomposition zone.

A simple method of using this technique consists of a tower divided into substantailly three compartments one above the other in each of which a dense phase fluidized bed can be maintained. The center bed is the decomposition zone. It is connected to a nitric acid recovery system. The top bed is the heating zone in which the fuel and air is burned. The bottom bed is used to preheat the air, flowing to the decomposition zone. The manganese dioxide from the decomposition zone flows into the bottom compartment through a down-comer pipe. Air is passed through the $MnO_2$ in the bottom zone thereby cooling the $MnO_2$ slightly and simultaneously removing any oxides of nitrogen that tend to cling to the manganese dioxide. The air flows into the second chamber after passing through the bottom chamber. In the second chamber the air helps to form nitric acid rather than oxides of nitrogen. Obviously, the oxides of nitrogen which are swept away from the manganese dioxide in the bottom chamber are recovered and carried to the nitric acid recovery system. The manganese dioxide in the bottom chamber is carried by an air lift to the top compartment. In the top compartment fuel and air are burned to raise the temperature of the $MnO_2$. The hot $MnO_2$ flows by means of a down-comer into the fluidized bed in the decomposition zone.

The decomposition of the manganous nitrate is rapid at a temperature of about 400° F. At the present time it is desirable to avoid construction and engineering problems by keeping the temperature of the heating zone below about 1100° F. although it is possible to use higher temperatures if necessary. Since the products of combustion will be higher in temperature than the temperature of the MnO₂, it is desirable to recover a considerable amount of the heat represented by these hot gases. This can be done in various ways. One method is to pass the gases through a waste heat boiler. Another is to use a series of compartments for heating the MnO₂ rather than one. The relatively cool MnO₂ is conveyed to the top of the series from which it passes down through the series to the compartment directly above the decomposition zone. In this compartment oil or gas is burned with air. The hot gases flow up through the series of compartments counter-current to the down coming manganese dioxide. In this way the gases can leave the system at about 500° F. The heat represented by gases at this temperature usually can be thrown away.

It will be observed that in the decomposition zone the fluidization medium is made up of air, steam or water vapor, and gaseous nitric acid. Only a small quantity of oxides of nitrogen is formed. The pressures are regulated so that any gaseous leakage between the heating compartment and decomposition compartment is in the direction of the decomposition compartment.

The gas leaving the decomposition zone is made up of water vapor, nitric acid, excess air and a small quantity of oxides of nitrogen. If the solution entering the decomposition zone may be represented as $$Mn(NO_3)_2 \cdot 5H_2O$$

and the water vapor contained in the air is neglected, then the mol ratio of nitric acid to water vapor in the gas is 1 to 2. Simple condensation results in the production of 63.6% nitric acid. The excess air will tend to carry off nitric acid vapor and any oxides of nitrogen unavoidably formed. The nitric acid and oxides of nitrogen are readily recovered from the excess air by washing the air with a slurry of manganous oxide and manganese dioxide. The manganous nitrate so formed is returned to the system at any convenient location.

The constant boiling mixture of nitric acid and water is 67% HNO₃. Any excess water that enters the system which is not wanted in the reaction tower can be removed by rectifying the acid to form water and the constant boiling mixture. The excess water is discarded and the acid returned to the process.

Since heat is required in nearly each step of the process and this heat is secured by burning fuel, large amounts of flue gas are available. If the elimination of the calcining of some of the limestone in the Solvay plant causes a deficiency of carbon dioxide, the deficit may be made up by using the flue gas as a source of CO₂. Well known means are available for securing carbon dioxide from flue gas and some of these processes are readily carried out at a Solvay ammonia soda plant.

In summary then, chlorine can be produced advantageously at a Solvay ammonia soda plant by omitting the liming and ammonia distillation step and replacing it by separating relatively pure ammonium chloride and reacting the pure ammonium chloride with manganous oxide to form manganous chloride and ammonia. The ammonia is recycled to the ammonia soda plant. The manganous chloride is reacted with nitric acid and manganese dioxide to form chlorine and manganous nitrate. The manganous nitrate is decomposed to form nitric acid and manganese dioxide. A portion of the manganese dioxide is reduced to manganous oxide. A product of the reduction step can be high strength carbon dioxide. In addition, flue gas can also be made to serve as a source of carbon dioxide. This eliminates the need for calcining limestone since carbon dioxide is made available and ammonia is recovered.

Each of the steps in the process can be carried out continuously, none of the necessary conditions is unduly severe, all of the reactions are relatively rapid and except for mechanical losses no reagents are consumed except the reducing agent employed in reducing the manganese dioxide to manganous oxide.

By changing the procedures to a certain extent it becomes possible to omit the use of a reducing agent as such. This variation of the process is particularly useful when a source of high strength carbon dioxide is not needed. Rather than reducing the manganese dioxide to manganous oxide by any of the known means and securing a product composed in large part of manganous oxide, the manganese dioxide is heated in an atmosphere which is neutral or non-oxidizing to a temperature which will form manganese sesquioxide. This temperature varies with the condition under which the heating is carried out. The conversion of manganese dioxide to manganese sesquioxide is well known. Simple heating above a temperature of 600° C. in a non oxidizing atmosphere will cause the reaction to take place. Heating under conditions where the oxygen evolved is removed so that the partial pressure of oxygen is reduced in the atmosphere surrounding the dissociating solid allows the reaction to proceed at markedly lower temperatures. The reaction may be written:

$$4MnO_2 = 2Mn_2O_3 + O_2$$

Instead of forming manganous chloride from manganous oxide and ammonium chloride, the manganese sesquioxide is reacted with the ammonium chloride. The reaction is carried out in the dry state. A mixture is formed that consists of manganese dioxide and manganous chloride.

The next step in the process is the chlorine formation reaction in which in addition to the nitric acid a mol of manganese dioxide is reacted with each mol of manganous chloride. The fact that the chloride and dioxide are already intimately mixed is an advantage rather than a disadvantage. Hence, the fact that less than half of the manganese dioxide is converted to manganous oxide is no disadvantage. The excess manganese dioxide passes through the process as though it were inert.

In the foregoing description the process has been concerned with the production of chlorine and ammonia from ammonium chloride. A process of this type can, as stated above, be used to advantage at the site of a Solvay ammonia soda plant. However, any source of ammonium chloride will permit the process to be operated in accordance with the methods hitherto described. An additional variation of the process is carried out as a specifically integrated step in the production of sodium carbonate and chlorine from salt, carbon dioxide producing fuel, and air.

Rather than separating ammonium chloride from the Solvay process filtrate using known methods, the filtrate is distilled by indirect heat exchange to recover a maximum of free ammonia and loosely combined ammonia such as ammonium carbonate, ammonium bicarbonate and ammonium sulfide. This step is similar to the preliming ammonia distillation of the normal Solvay process except that all of the heating is preferably carried out indirectly i. e. the direct injection of steam is not used. This distillation frees the solution of substantially all of its volatile constituents with the exception of water. If desired, the resulting solution may be additionally concentrated in part by evaporation, although this is usually not necessary. The two principal constituents of the solution are ammonium chloride and sodium chloride. Solid manganous oxide is added to the solution and the solution is concentrated by evaporation. The manganous oxide goes into solution and gaseous ammonia is evolved.

The ammonia is recycled for reuse in the carbonating towers. The solution is now composed substantially of sodium chloride and manganous chloride. The solution is concentrated by evaporation. By appropriate crystallization procedures manganous chloride is recovered preferably as a solid containing not more than two mols of water of hydration, $MnCl_2 \cdot 2H_2O$ and substantially free from sodium chloride. The manganous chloride so formed is reacted with manganese dioxide and nitric acid in the chlorine formation step of the process. Forming manganese chloride in this way also permits the sodium chloride to be recovered and recycled to the soda ash plant. In this variation of the process, the replacement of the lime by the manganous oxide is even more direct than in the other variations. It has been previously explained that the necessary amounts of carbon dioxide can be secured in large part from the gases formed in the reduction step and from flue gas. The overall reaction of the process can be written

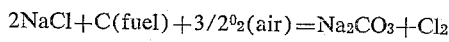

The formation of chlorine is conveniently carried out in a reaction tower. An alternative procedure is the use of a number of reactors through which the reactants flow in series and in which the temperature is progressively increased. The gases leaving the reactors enter a common header which convey them to a scrubbing tower or any other suitable means for contacting the gases with a slurry of manganese dioxide. In carrying out the reaction it is necessary to introduce into the reaction zone solid manganese dioxide and in some instances solid manganous chloride. The introduction of these solids to the reaction zone by even elaborate mechanical solid feeding devices allows some air into the system. This air mixes with the evolved chlorine and makes for difficulty in the liquefaction of the chlorine. This serious problem is overcome by introducing the solid reactants in the form of a slurry. A pumpable slurry is made up of the solids and a manganous nitrate solution. This materially simplifies the feeding of the reactants to the reaction zone and minimizes to a substantial degree the entrance of extraneous fixed gases into the chlorine production system. The manganous nitrate solution is preferably of the same composition as that flowing to the thermal decomposition step. In this way an important object of the invention is achieved, namely the production of chlorine in the absence of any substantial amount of fixed gases.

What is claimed is:

1. The process of producing chlorine and ammonia from ammonium chloride which comprises reacting ammonium chloride with manganous oxide, the mol ratio of ammonium chloride to manganous oxide being substantially two to one, to form ammonia and manganous chloride, separating the ammonia from the manganous chloride, reacting the manganous chloride with manganese dioxide and nitric acid, employing not less than 1 mol of manganese dioxide and not less than 4 mols of nitric acid for each mol of manganous chloride, at a temperature sufficiently elevated to form gaseous chlorine and manganous nitrate, separating the chlorine from the manganous nitrate, thermally reacting the manganous nitrate in the presence of air and water to form nitric acid and manganese dioxide, separating and recovering the nitric acid, recycling the recovered nitric acid to the chlorine formation step of the process, reducing a part of the manganese dioxide to manganous oxide, the amount of manganous oxide formed being not less than the amount consumed in the ammonia liberation step, recycling the manganous oxide to the ammonia liberation step and recycling the remainder of the manganese dioxide to the chlorine formation step.

2. The process of claim 1 in which the manganous oxide and ammonium chloride are reacted together by heating an intimate mixture comprised of ammonium chloride and manganous oxide to an elevated temperature to form gaseous ammonia and substantially solid manganous chloride.

3. The process of claim 1 in which the manganous oxide and ammonium chloride are reacted together in an aqueous medium at a temperature not in excess of the boiling point of the solution to form ammonia which leaves the solution as a gas and a solution of manganous chloride.

4. The process of claim 3 in which the solution of manganous chloride is concentrated to form dihydrated manganous chloride prior to the chlorine reaction step.

5. The process of claim 4 in which the manganous oxide is added to an ammonium chloride containing solution, said solution being the filtrate from an ammonia soda plant freed from its volatile ammonia and carbonate components prior to the addition of the manganous oxide, and in which the sodium chloride is separated from the dihydrated manganous chloride prior to the chlorine formation reaction.

6. The process of claim 1 in which the thermal reaction of the manganous nitrate in the presence of air to form nitric acid and manganese dioxide is carried out by spraying a concentrated solution of manganous nitrate into a dense phase fluidized bed of manganese dioxide maintained at a temperature of about 200° C.

7. The process of claim 1 in which the thermal reaction of the manganous nitrate in the presence of air and water to form nitric acid and manganese dioxide is carried out by spraying a concentrated solution of manganous nitrate into a dense phase fluidized bed of manganese dioxide held at a temperature of about 200° C. by the withdrawal of a portion of the manganese dioxide to a region where its temperature is raised above 200° C. and returning the heated manganese dioxide to the reaction zone.

8. The process of claim 1 in which the gaseous chlorine that is evolved is washed with an aqueous slurry of manganese dioxide to free it from gaseous contaminants other than fixed gases and thereby recover any oxides of nitrogen admixed with the chlorine.

9. The process of claim 1 in which the air after passing through the manganous nitrate thermal reaction step is washed with a slurry of manganese dioxide to free it from constituents other than fixed gases and to thereby recover any oxides of nitrogen in the air stream.

10. The process of claim 1 in which the manganese dioxide is reduced with a carbon containing reducing agent under muffle conditions to form manganous oxide and a gaseous stream with a substantial carbon dioxide concentration.

References Cited in the file of this patent

UNITED STATES PATENTS

| | | |
|---|---|---|
| 304,260 | Carey et al. | Aug. 26, 1884 |
| 320,256 | Kayser | June 16, 1885 |
| 348,348 | Rumpf | Aug. 31, 1886 |
| 379,488 | Mond | Mar. 13, 1888 |
| 495,462 | Just | Apr. 11, 1893 |
| 570,624 | Donald | Nov. 3, 1896 |
| 2,044,799 | McCarthy | June 23, 1936 |
| 2,176,776 | Sweet | Oct. 17, 1939 |
| 2,534,298 | Rosenstein | Dec. 19, 1950 |

FOREIGN PATENTS

| | | |
|---|---|---|
| 3,089 | Great Britain | 1875 |